United States Patent [19]

Schrauder

[11] Patent Number: 4,842,361
[45] Date of Patent: Jun. 27, 1989

[54] CONNECTION CLAMP AND CUTTING DEVICE FOR FIBER OPTIC LIGHT GUIDE

[75] Inventor: Franz Schrauder, Litzendorf, Fed. Rep. of Germany

[73] Assignee: F. Wieland Elektrische Industrie GmbH, Bamberg, Fed. Rep. of Germany

[21] Appl. No.: 230,645

[22] Filed: Aug. 10, 1988

[30] Foreign Application Priority Data

Aug. 14, 1987 [DE] Fed. Rep. of Germany ....... 3727092

[51] Int. Cl.$^4$ .......................... G02B 6/38; B26D 7/00; B26F 3/02
[52] U.S. Cl. ............... 350/96.20; 350/96.21; 83/167; 225/23
[58] Field of Search ............... 350/96.20, 96.21, 96.22; 83/167, 178, 179; 225/2, 21, 22, 23, 96, 105, 96.5

[56] References Cited

U.S. PATENT DOCUMENTS

| 3,999,841 | 12/1976 | Dakss et al. | 350/96.20 X |
|---|---|---|---|
| 4,150,870 | 4/1979 | D'Auria | 350/96.20 X |
| 4,181,401 | 1/1980 | Jensen | 350/96.21 |
| 4,182,017 | 1/1980 | Ford et al. | 350/96.21 X |
| 4,203,539 | 5/1980 | Miller | 225/2 |
| 4,422,715 | 12/1983 | Williams et al. | 350/96.20 |
| 4,448,481 | 5/1984 | Basov et al. | 350/96.20 |
| 4,548,466 | 10/1985 | Evans et al. | 350/96.20 |
| 4,582,392 | 4/1986 | Williams et al. | 350/96.20 |
| 4,645,295 | 2/1987 | Pronovost | 350/96.20 |
| 4,770,487 | 9/1988 | Williams | 350/96.20 |

FOREIGN PATENT DOCUMENTS

| 56-155903 | 12/1981 | Japan | 350/96.20 X |
|---|---|---|---|
| 61-90106 | 5/1986 | Japan | 350/96.20 X |

Primary Examiner—William L. Sikes
Assistant Examiner—Brian M. Healy
Attorney, Agent, or Firm—Jordan and Hamburg

[57] ABSTRACT

A connection clamp for fiber optic light guides to receive and to hold a fiber optic light guide while forming a frontal surface in a defined position in the plane of an exit opening, with a guide housing that contains a cutting edge at some distance from the exit opening, and with a use housing that can be moved therein between a mounting position and a use position of the fiber optic light guide, and with a through recess for the fiber optic light guide. The box-shaped guide housing has a guide channel, which surrounds the use housing that is constructed as a cuboid sliding block with a through hole. The cutting edge lies in the side wall of the guide channel, which contains the exit opening. A longitudinal slot for the fiber optic light guide is provided in the side wall of the guide channel, which lies opposite to the exit opening. The use housing can be moved between the mounting position and the use position by means of an adjustment screw in the guide channel.

20 Claims, 1 Drawing Sheet

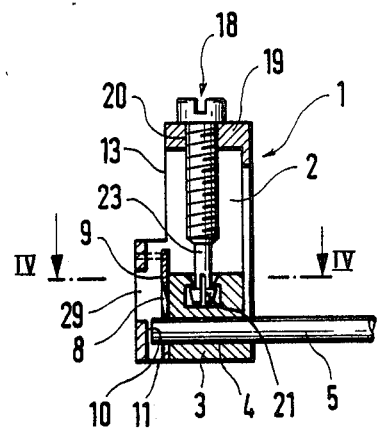
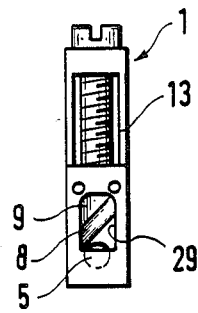
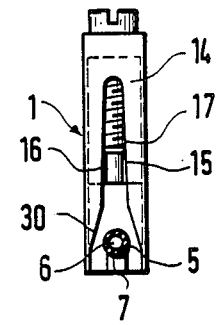
FIG. 1  FIG. 2  FIG. 3
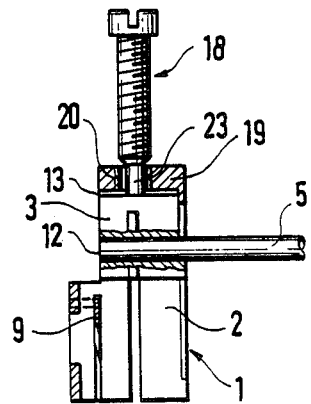
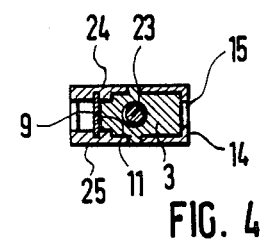
FIG. 5  FIG. 4
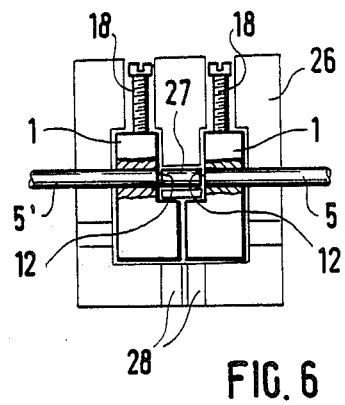
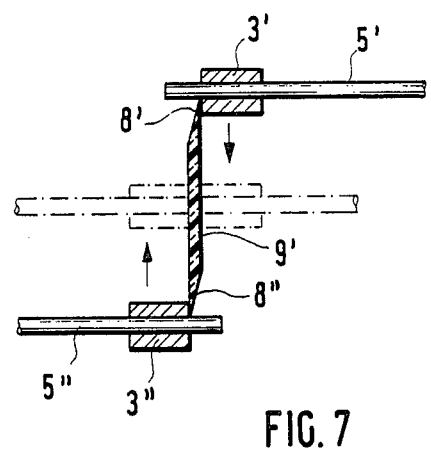
FIG. 6  FIG. 7

CONNECTION CLAMP AND CUTTING DEVICE FOR FIBER OPTIC LIGHT GUIDE

BACKGROUND OF THE INVENTION

The invention relates to a connection clamp for fiber optic light guides to receive and hold a fiber optic light guide while forming a frontal surface situated in defined fashion in the plane of an exit opening, with a guide housing that contains a cutting edge at some distance from the exit opening and with a use housing that can be moved therein between a mounting position of the fiber optic light guide and the use position with a through hole that is flush with the exit opening, and that has a through recess for the fiber optic light guide.

Connection clamps for fiber optic light guides for the defined holding of a fiber optic light guide or for connecting two fiber optic light guides have already become known in the most diverse embodiments. Arrangements have been proposed, in which a housing to receive the fiber optic light guide is turned with respect to a second housing in order to cut off the ends of the fiber optic light guide (Offenlegungsschrift DE 32 23 121 A1), corresponding to U.S Pat. No. 4,422,715,. In addition, a connection clamp for fiber optic light guides has also already been proposed, in which, to connect the two fiber optic light guides, their ends are separated here by means of a cutting die, which traverses a holding housing crosswise (German Patent 3,208,736 C1). However, this connection clamp requires not only that the housing be of a relatively complicated structure, but also that the insulation be stripped previously from the fiber optic light guide.

Furthermore, the German Patent No. 3,313,835, corresponding to U.S. Pat. No. 4,582,392, has also already proposed a connection clamp for a fiber optic light guide of the type mentioned in the introduction, by means of which a fiber optic light guide with a front edge, which is cut off in a definite way, is held in a housing so that it can then be positioned in a defined fashion with respect to an optoelectric device of any kind. The arrangement pursuant to the cited U.S. Pat. No. 3,313,835 first of all has the disadvantage that it has an extraordinarily complicated structure, and especially that the use housing is designed as a special clamp housing with mutually movable vanes, so as to be able to hold fast fiber optic light guides of different diameters. To this must be added the difficulty that, on account of the ribs, which align the use housing in the use position and in the mounting position, a very severe deformation of the use housing is necessary. This deformation makes it more difficult to compress the use housing, during which compression the fiber optic light guide is really supposed to be cut off. To this must be added that cutting off the end of the fiber optic light guide requires considerable force, especially in the case of thicker fiber optic light guides, so that a connection clamp for fiber optic light guides of U.S Pat. No. 3,313,835, on the whole, creates considerable difficulties in practice. Another factor here is that such a clamp is very large, on account of the special structure of the guide housing, and thus requires a great deal of space. This makes its use in control boxes with a large number of fiber optic light guide connections difficult.

SUMMARY OF THE INVENTION

It is therefore an object of the invention to provide a connection clamp for fiber optic light guides of the type mentioned, which has a simpler and less bulky structure, which can be operated more easily and which furthermore can easily be extended to form a junction clamp for fiber optic light guides.

To achieve this objective, the invention provides that the box-shaped guide housing has a guide channel, which on all sides surrounds the use housing that is constructed as a cuboid sliding block and that is equipped with a through hole. The cutting edge lies in the side wall of the guide channel, which contains the exit opening and a longitudinal slot for the fiber optic light guide is provided in that side wall of the guide channel, which lies opposite the exit opening. The use housing can be moved by means of an adjusting screw in the guide channel between the mounting position of the fiber optic light guide and the use position.

The inventive design results in a compact structure for a connection clamp for a fiber optic light guide. Not only can this structure be readily integrated into an outer housing consisting preferably of plastic, but with it the adjustment of the use housing is also much simpler and more exact than it is with the arrangements described previously. By providing an adjustment screw, the fiber optic light guide is connected in a way that is known to those skilled in the art and is the same as that by which an electric conductor is connected with the help of a clamping screw. In this connection, it is especially important that, by virtue of the pitch translation of such an adjustment screw, the cutting force can be applied much more easily then when the use housing must be pressed manually into the guide housing. This is especially the case when, in so doing, a severe deformation of the use housing is necessary, as is in the already described U.S. Pat. No. 3,313,835. To complete the comparability with known clamps for electrical conductors, and thus to take account of established habits, the adjusting screw can also be provided with a left handed, thread, so that the fiber optic light guide is brought from the mounting position into its final or use position by turning the adjustment screw to the right.

The fiber optic light guide is held in such a fashion that, when it moves past the cutting edge, it cannot shift within the through hole of the use housing. This can be accomplished very simply in a further development of the invention by boundary edges of the longitudinal slot, which are designed as cutting edges and serve to cut into the insulating material of the fiber optic light guide. As a result of this design, considerably less force is required for the lengthwise fixation of the fiber optic light guide in the through hole of the use housing than for the already described deformation of the complicated use housing of German Patent No. 3,313,835 C2. In addition, there is the decisive advantage that, with this mode of partially incising the insulating material, there is no deformation of the interior of the fiber optic light guide. If at all possible, such deformation should be avoided in a connection clamp for fiber optic light guides.

According to a second embodiment of the present invention, in the case of a guide housing of appropriate construction of a rigid, pressureresistant inflexible material, especially of metal and of a use housing constructed from an elastically deformable material, for example a plastic, provisions can also be made so that the guide channel of the guide housing tapers in the direction of the use position with deformation of the use housing to clamp the fiber optic light guide.

This manner of clamping the fiber optic light guide differs in several respects from that of the jaw clamping device of U.S. Pat. No. 3,313,835 C2, which has already been referred to several times. On the one hand, there is on jaw clamping, with which a much more severe deformation of the fiber optic light guide is possible. Rather, the fiber optic light guide is held in an all embracing hole. A slight deformation of the outside casing therefore is sufficient for clamping, since the insulation casing is supported at the same time in the transverse direction at the inner wall of the hole. This is not the case with a jaw clamping. In addition, because of the tapering of the guide channel, the maximum force that need be applied to shift the guide housing is much less than with the previously known clamp, where the ribs, when released from the guide groves, must be crushed suddenly to a very much finer diameter, for which process considerable compressive forces are required. The activation of an inventive fiber optic light guide connection clamp is thus also very much simpler from the point of view of the force which the operator must apply - quite apart from the fact that this force can be applied much more simple by the adjustment screw.

Especially in the case where the bounding edges of the longitudinal slot are designed as cutting edges for immovably mounting the fiber optic light guide, provisions are made in a refinement of the invention so that the longitudinal slot has a wedge-shaped guide expansion in the area of the use position of the fiber optic light guide. This wedge-shaped guide expansion makes insertion of the fiber optic light guide very simple, since initially it has no contact at all with the edges of the longitudinal slot. When the use housing is shifted by means of the adjustment screw in the direction of the mounting position, the wedge-shaped tapering cutting edges penetrate the insulating material of the fiber optic light guide gradually, and thus free of jolts and shifts.

To simplify the operation of an inventive connection clamp for fiber optic light guides even further, provisions may be made in accordance with a further feature of the present invention so that the guide housing is widened stepwise towards the outside in the region of the mounting position of the fiber optic light guide disposed at one end. This feature serves to form a receiving space for a knife, which forms the cutting edge, as well as to form an insertion limiting stop for the fiber optic light guide. In this fashion, it is sufficient for the operator simply to insert the fiber optic light guide into the prepared connection clamp for fiber optic light guides, situated in its receiving position. This is done in such a fashion that the fiber optic light guide is pushed into the through hole of the use housing as far as the stop, and subsequently the clamping screw is actuated. No further adjustment work or special considerations are required in order to achieve the desired result. When the fiber optic light guide is cut off, the end section of the fiber optic light guide—which in this case is held very briefly—simply falls out through the lower opening of the guide channel.

To increase further the already mentioned operating convenience of an inventive connection clamp for fiber optic light guides, the adjustment screw, which is connected with the use housing so that it can freely rotate, should be dimensioned so that its two end positions yield the use position and the mounting position of the use housing. Thus, by setting the adjustment screw respectively to one of the end points, the two positions are automatically obtained, and here too no special care and consideration on the part of the operator is required.

It has here proven suitable for the adjustment screws to have a section at their end, which connects to the use housing, this section being free of thread, and which prevents excess turning of the screw when pulling up into the mounting position.

The inventive connection clamp for fiber optic light guides is also suitable to be modified easily into a for fiber optic light guides junction clamp for joining two fiber optic light guides together. For this purpose, for example, two use housings are disposed in one connection clamp for fiber optic light guides, so that they can be shifted with respect to a double cutting edge knife. A section, which is transparent to light, is provided in the center of the knife, so that, after shifting into the use position, in which the two fiber optic light guides are flush with one another, there is optical contact through this transparent section. The transparent section can be an opening in the cutting edge. On the other hand, transparency can also advantageously be achieved owing to the fact that the double cutting edge knife consists of a transparent material.

Finally, a junction clamp to connect two fiber optic light guides by means of the inventive connection clamps for fiber optic light guides can also be attained very simply by providing a junction device to connect together two single connection clamps for fiber optic light guides, that are displaced 180° with respect to one another. This can be accomplished especially simply by gathering together the two connection clamps for fiber optic light guides through an external housing, preferably consisting of plastic. Furthermore, to improve the optical coupling in the housing, a fiber optic light guide which connects the exit openings of individual connection clamps for fiber optic light guides can be provided.

Further advantages, features, and details of the invention are apparent from the following description of some embodiments as well as from the drawing. Here the following are shown:

BRIEF DESCRIPTION OF THE DRAWINGS

FIG. 1 shows a longitudinal section through an inventive connection clamp for fiber optic light guide.

FIG. 2 shows a view of the clamp according to FIG. 1, as seen from the exit side of the fiber optic light guide.

FIG. 3 shows a view of the clamp, turned by 180°, from the entry side for the fiber optic light guide.

FIG. 4 shows a cross section along the line IV—IV in FIG. 1.

FIG. 5 shows a section corresponding the FIG. 1, which shows the mounting position of the fiber optic light guide, this section being through the connection clamp for the fiber optic light guide when the fiber optic light guide is in its use position.

FIG. 6 shows a schematic representation of a junction clamp for a fiber optic light guide, consisting of two individual connection clamps for fiber optic light guides with an exterior housing that gathers them together.

FIG. 7 shows a schematic representation of the structure of a junction clamp for fiber optic light guides with two use housings that are adjustable with respect to one another through a double cutting cutting edge.

DETAILED DESCRIPTION OF THE INVENTION

The inventive fiber optic light guide connection clamp shown in FIGS. 1 through 4 comprises a box-shaped guide housing 1 with a guide channel 2 for a use housing 3 that is designed as a cuboid sliding block, which has a longitudinal hole 4 to accept a fiber optic light guide 5. The fiber optic light guide 5 here comprises the actual core 6 of the fiber optic light guide, which can consist of several individual fiber optic light guides, and an external insulating casing 7 made of rubber, plastic or the like. The lower end of the guide housing 1 is stepwise widened towards the outside in order to form a receiving space for a knife 9 which forms the cutting edge 8, as well as to form an insertion limiting stop 10 for the fiber optic light guide 5. Above the knife 9, the corresponding side wall of the guide housing 1 is open over the entire width of the frontal face surface 11 of the use housing 3, so that this front surface 11 and thus also the cut-off front surface 12 of the fiber optic light guide 5 lie in this open front plane. For example, another optoelectronic component can then be disposed in this plane, whether this be a light source, for example an LED or a laser diode, or a light-sensitive sensor, or also the frontal surface of another fiber optic light guide. the side wall 14 of the guide housing, which is situated opposite the exit opening 13, has a longitudinal slot 15, whose bounding edges 16 and 17 are designed as cutting edges to cut into the insulating casing 7 of the fiber optic light guide 5. The longitudinal slot 15 here has a wedge-shaped guide expansion 30 at its lower end, so that, in the use position of the fiber optic light guide shown in FIG. 1, it can be inserted without any problem into the through hole 4 of the use housing, until it strikes against the insertion limiting stop 10.

The use housing is adjusted in the guide housing by means of an adjustment screw 18, which penetrates an upper covering wall 19 of the guide housing with an internal thread boring 20, and whose slotted snap-in head 21 is connected with the use housing 3 so that it can rotate freely. The fully screwed-in position shown in FIG. 1 corresponds to the mounting position, in which the fiber optic light guide is introduced, while the use position shown in FIG. 5 corresponds to the screwed-out position of the adjustment screw 18. This end determination is formed in the embodiment shown by providing a thread-free section 23 at the inside end of the adjustment screw 18. Thus the adjustment screw turns idly when the use position has been reached, and at the same time an excess turning of the adjustment screw 18 is prevented. When the use housing 3 is pulled up from the mounting position shown in FIG. 1 into the use position according to FIG. 5, the bounding edges 16, 17 of the longitudinal slot 15 should preferably already cut into the insulating casing 7 of the fiber optic light guide 5, before cutting occurs at the cutting edge 8 of the knife 9, so that no longitudinal displacement of the fiber optic light guide can any longer occur during the cutting process. Through this axially immovable mounting of the fiber optic light guide, it is also possible to design the large exit opening 13 in such a fashion that counter component can be disposed directly in the plane of this exit opening. The displacement of the use housing 3 through the exit opening 13 can be prevented by the special graded design of the guide channel 2, as shown in FIG. 4. Two different guide arrangements are provided there, namely the gradation connecting to the frontal surface 11 and a guide engagement along the mutually opposite side walls 24 and 25.

FIG. 6 shows schematically a junction clamp for fiber optic light guides, composed of two connection clamps for the fiber optic light guides according to the invention. Here, two connection clamps for fiber optic light guides, which are mutually displaced by 180°, are inserted in an outer insulating housing 26 made of plastic, which preferably is designed so as to have two parts that can interlock with one another. Between the frontal surfaces 12 of the two fiber optic light guides 5 and 5', there is additionally a fiber optic light guide 27 which improves the optical coupling, and which is rigidly installed in the insulating housing.

FIG. 7 schematically shows a portion of another inventive junction clamp for fiber optic light guides, in which two use housings 3' and 3" can be moved against one another by means of adjustment screws, in the direction of the shown arrows. This is done in such a fashion that they are moved past the cutting edges 8' and 8" of a double-edged knife 9', so as to be flush with one another in the mounting position (drawn by dots and dashes). Either the knife can be made of a transparent material, or an opening can be provided in its middle, so as to optically couple the mutually aligned fiber optic light guides 5' and 5".

When there is a housing 26 which surrounds the connection clamp for fiber optic light guides with a guide channel open towards the bottom, as is shown in FIG. 6, there naturally must be housing exit openings 28, through which the cut-off end sections of the fiber optic light guide 5 can fall out downwards, since in this case they cannot fall out from the opening 29, as these openings are turned towards one another and are covered by the respectively other connection clamp for fiber optic light guides.

In FIG. 6 it would also be conceivable to insert the two clamps for fiber optic light guides into the plastic housing for apart from one another, so that the opening 29 remains free and the cut-off part of the fiber optic light guide could fall out through it and through a corresponding opening in the plastic housing. The necessary extension of the utilized piece of fiber optic light guide here does not impair the passage of light.

What I claim is:

1. A connection clamp for fiber optic light guides for receiving and holding a fiber optic light guide comprising a guide housing having a slide passage, a slide block slidable in said slide passage between a mounting position and a use position, means defining a through hole in said slide block, said through hole receiving said light guide, said through hole having an exit end, a cutting edge means mounted on said housing and disposed adjacent to said exit end, and threaded means threaded in said housing and operatively connected to said slide block such that rotation of said threaded means moves said slide block between said mounting position and said use position, said cutting edge means being operable to cut said light guide disposed in said through hole in said slide block as said slide block is moved from said mounting position to said use position by said threaded means.

2. A connection clamp according to claim 1. wherein said light guide has an outer insulation layer, said housing having a first end portion and a second end portion, said housing having an elongated slot extending between said first and second end portions, said through hole having an entrance end, said elongated slot being disposed adjacent to said entrance end, said light guide passing through said slot, said slot having edges formed as cutting edges which cut into said insulation layer of said light guide as said slide block moves said light guide from from said mounting to said use position.

3. A connection clamp according to claim 2, wherein there are two of said cutting edges which converge towards one another as said use position is approached.

4. A connection clamp according to claim 2, wherein said elongated slot has a light guide receiving portion through which said light guide freely traverses when said slide block is in said mounting position.

5. A connection clamp according to claim 1, wherein said housing has a first housing portion and a second housing portion, said housing having a width considered in a direction parallel to the axis of said through hole, said first housing portion being that portion of the housing in which said slide block is disposed when said slide block is in said mounting position, said second housing portion being that portion of the housing in which said slide block is disposed when in said use position, said first portion having a greater width than said second position, said cutting means being mounted on said first portion of said housing.

6. A connection clamp according to claim 5, wherein said first portion of said housing has a stop means spaced from said exit end of said through hole when said slide block is in said mounting position, said stop means being generally axially aligned with the axis of said through hole when said slide block is in said mounting position.

7. A connection clamp according to claim 1, wherein said housing has a first portion which extends stepwise from a second portion of said housing to define a widened stepped first portion on said housing, said cutting edge means being disposed in said first portion of said housing.

8. A connection clamp according to claim 1, wherein said housing is made of a rigid material and said slide block is made of an elastically deformable material.

9. A connection clamp according to claim 8, wherein said housing is made of metal and said slide block is made of plastic.

10. A connection clamp according to claim 1, wherein said housing has a first portion in which said slide block is disposed when in said mounting position, said housing having a second portion in which the slide block is disposed when in said use position, said slide passage having side walls which extend between said first and second housing portions and which converge towards one another as said second portion of said housing is approached, said slide block being deformed by said converging side walls as said slide block is moved from said mounting position to said use position by said threaded means to thereby effect clamping of said light guide in said through hole.

11. A connection clamp according to claim 1, wherein said threaded means has a stop means engageable with said housing to determine said mounting position of said slide block.

12. A connection clamp according to claim 1, wherein said threaded means has a threaded portion and a non-threaded portion, said housing having a thread-engaging means threadedly engaging said threaded portion of said threaded means when said threaded means moves said slide block between said mounting and said use positions, said non-threaded portion passing into said thread-engaging means after said slide block has reached its use position and said threaded means is further rotated.

13. A connection clamp according to claim 1, wherein said threaded means has a lefthanded thread.

14. A junction clamp for connecting two fiber optic light guides comprising a pair of internal housing means each having a slide passage, a slide block slidable in each of said slide passages, each of slide blocks being slidable between a mounting position and a use position, means defining a through hole in each of said slide blocks, each of said through holes having an exit end, a cutting edge means mounted in each of said internal housing means and disposed adjacent to the respective exit end of each through hole, threaded means threaded on each of said internal housing means and operatively connected to the respective slide block such that rotation of each of said threaded means moves the respective slide block between its mounting position and its use position, each of said cutting edge means being operable to cut a light guide disposed in the respective through hole in each of said slide blocks as each of said slide blocks is moved from its respective mounting position to its use position by the respective threaded means, and an external housing means mounting each of said internal housing means in a position in which the axis of each of said through holes is axially aligned when each of said slide blocks is in its respective use position.

15. A junction clamp according to claim 14, wherein each of said through holes is axially aligned when each of said slide blocks is in its respective mounting position.

16. A junction clamp according to claim 14, wherein said external housing means is made of a plastic material.

17. A junction clamp according to claim 14, wherein each of said light guides in each of said through holes has a cut end formed after each of said light guides has been cut by the respective cutting means, said cut ends of each light guide being axially aligned and spaced from one another when each of said slide blocks is in its respective mounting position, and a connecting light guide disposed in said space between said two axially aligned cut ends.

18. A junction clamp for connecting two fiber optic light guides comprising a housing means having a pair of slide passages, a slide block slidable in each of said slide passages, each of said slide blocks being slidable between a mounting position and a use position, means defining a through hole in each of said slide blocks, each of said through holes receiving a light guide, each of said through holes having an exit end, a double edge knife means mounted on said housing means and disposed adjacent to each of said exit ends, and a pair of threaded means on said housing means and each operatively connected to one of said slide blocks such that turning of each of said threaded means moves each of said slide blocks between its mounting position and its use position, said double edge knife means being operable to cut each light guide disposed in its respective through hole in each of said slide blocks as each of said slide blocks is moved from its mounting position to its use position by each of said threaded means.

19. A junction clamp according to claim 18, wherein said double edge knife means has a center transparent section axially aligned with said light guides in said through holes when each of said slide blocks is in its use position.

20. A junction clamp according to claim 18, wherein said double edge knife means is made of a transparent material.

* * * * *